United States Patent [19]
Fiedler

[11] 3,923,923
[45] Dec. 2, 1975

[54] TOUGHENED POLYSTYRENE
[75] Inventor: Lawrence D. Fiedler, Midland, Mich.
[73] Assignee: Dow Corning Corporation, Midland, Mich.
[22] Filed: Mar. 11, 1974
[21] Appl. No.: 449,863

[52] U.S. Cl. ............................... 260/827; 260/886
[51] Int. Cl.² ................... C08L 51/08; C08L 83/10; C08F 283/12
[58] Field of Search .................................. 260/827

[56] References Cited
UNITED STATES PATENTS
2,965,593  12/1960  Dietz.................................. 260/827
3,657,164   4/1972  Jastrow et al....................... 260/827

OTHER PUBLICATIONS
Saam, J. C., et al., "Toughening Polystyrene With Silicone Rubber," SPE Journal, Apr. 1973, Vol. 29, pp. 58–62.

Primary Examiner—Wilbert J. Briggs, Sr.
Attorney, Agent, or Firm—Roger H. Borrousch

[57] ABSTRACT

Polymerizing styrene by mass polymerization in the presence of a polydiorganosiloxane gum having 0.1 to 30 mol percent methylvinylsiloxane units in amounts of from 0.25 to 30 weight percent polydiorganosiloxane gum, produces a toughened polystyrene composition having improved notched Izod impact strength and improved lubricity. The polystyrene can be used to cold form objects and can be used in applications where moderate lubricity is required.

3 Claims, No Drawings

3,923,923

TOUGHENED POLYSTYRENE

BACKGROUND OF THE INVENTION

1. Field of the Invention

This invention relates to a rubber toughened polystyrene, specifically to a polydiorganosiloxane gum toughened polystyrene having lubricity.

2. Description of the Prior Art

It is known that polystyrene can be toughened by certain rubbery particles dispersed in the polystyrene matrix, such rubbery particles include materials like polybutadiene, styrene-butadiene copolymers, and other rubber-like materials. The prior art has suggested many ways of making toughened polystyrene, however, it is observed that each specific type of rubbery material has certain modes of manufacture. Some prior art has suggested blending the components, some have suggested copolymerization of the components, some methods involve many steps including the use of dispersing agents and solubilizing agents because the rubbery materials are incompatible, as a rule, with the polystyrene.

For example, Colgan et al. in U.S. Pat. No. 3,090,767 describes a number of general prior art methods for combining the rubbery materials with monovinyl aromatic resins. Colgan et al. also teaches a new method for making a monovinyl aromatic resin-rubber blend. The method is essentially a blending method wherein a polymethylstyrene-methylstyrene monomer mixture is mixed with a rubber methylstyrene monomer mixture or a rubber latex, wherein the rubber is a material like SBR rubber. The mixing takes place in an extruder which devolatizes the volatile materials during the mixing operation. Prior art references like Colgan et al. often suggest in a list of rubbery materials that silicone rubber can be used in their method, however, these prior art references do not use silicone rubber in illustrations of their inventions. Additionally, further identification of the term "silicone rubber" is often left to ones imagination. Where one recites a copolymer of styrene and butadiene, one understands that the copolymer contains two basic units, a styrene unit and a butadiene unit. However, the term silicone rubber cannot be understood to mean anything specific because it is a generic term which can be used for thousands of materials, cured, uncured, filled, unfilled, and having any number of combinations of any number of monovalent radicals attached to the silicon atom in the silicon-oxygen-silicon backbone.

Many prior art references teach that polysiloxanes can be used as the backbone to which vinylic monomers can be attached by graft polymerization. Such references suggest that unsaturation in the polysiloxane should be avoided. These references, however, are directed to the concept of making copolymeric materials and are not concerned with producing a toughened polystyrene.

It is recognized that it is known to polymerize vinylic monomers in the presence of silicone rubber and other polysiloxanes. Each method of polymerizing vinylic monomers in the presence of silicones specify certain types of silicones for their unique processing steps and few relate to a toughened polystyrene by such techniques.

Toughening of thermoplastics is taught by Saam in U.S. Pat. No. 3,686,356. Saam teaches that certain blends comprising a thermoplastic, a polydiorganosiloxane and a copolymer of the thermoplastic and the polydiorganosiloxane can be made by an "in situ" method. This in situ method requires two polydiorganosiloxanes, one which is unreactive with the vinylic monomer and another which contains groups reactive with free radicals of the polymerizing system wherein the vinylic monomer and the reactive polydiorganosiloxane copolymerize to form a copolymer in situ. The resulting product from Saam is apparently toughened by the plasticization effect of the polydiorganosiloxane. Although Saam suggests that his blends can be made by bulk polymerization, he does not provide any details of how such a method would be accomplished and there is no method suggested for producing gelled particles.

In a more recent invention, Lindsey and Saam in Ser. No. 249,327, filed May 1, 1972 teach how certain thermoplastics can be toughened by a method which produces gelled particles in the thermoplastic matrix. Lindsey and Saam disperse in the thermoplastic monomers a polydiorganosiloxane gum having from 15 to 25 mol percent diorganosiloxane units containing vinyl or allyl radicals and then polymerize the mixture at 35°C. to 200°C. by free radical means while the mixture is being agitated. Lindsey and Saam were limited to a vinyl or allyl content of from 15 to 25 mol percent in their disclosed process requiring agitation during the polymerization by free radical means at temperatures from 35°C to 200°C. Although Lindsey and Saam suggest that mass polymerization can be used, they require certain conditions such as the polydiorganosiloxane is present during the polymerization of the monomeric compounds, the polymerization is by free radical means and the polymerizing medium is agitated to ensure thorough distribution of the polydiorganosiloxane.

Thus, the prior art suggests that silicones can be mixed with thermoplastics and that polydiorganosiloxane gums can be used to toughen thermoplastics. Although the prior art hints at bulk or mass polymerization of thermoplastics, there is no method or technique described to make a toughened thermoplastic using silicones in such polymerizations.

SUMMARY OF THE INVENTION

An object of this invention is to provide a toughened polystyrene by mass polymerization which also has lubricity and resists discoloration under high temperature conditions by using a polydiorganosiloxane gum.

This invention relates to a mass polymerization method of styrene using a polydiorganosiloxane gum having a wide range of vinyl content wherein a toughened polystyrene composition is obtained as observed by notched Izod impact strength test. This invention also related to a toughened polystyrene composition with improved impact strength, lubricity and resistance to discoloration compared to polybutadiene modified polystyrene.

DESCRIPTION OF THE INVENTION

This invention relates to a method for the mass polymerization of styrene comprising (A) heating at a temperature from 80° to 150°C. a mixture of 70 to 99.75 weight percent styrene and 0.25 to 30 weight percent of a benzene soluble polydiorganosiloxane gum, said mixture being heated and agitated until from 10 to 40 weight percent of the styrene has polymerized producing a partially polymerized styrene mixture having dispersed therein particles containing the polydiorganosiloxane gum, said agitation being at a sufficient rate to provide an average particle size of from 0.5 to 10 microns, (B) continuing to heat the partially polymerized styrene mixture at a temperature higher than in step (A) until the styrene is substantially polymerized to polystyrene, during step (B) the agitation rate being reduced below the rate of step (A); thereafter (C) heating the product obtained from step (B) above 200°C. for at least 10 minutes and until the polymerized mass is substantially free of volatile ingredients but at temperatures and times insufficient to degrade the polystyrene, and thereafter a toughened polystyrene is obtained which consists essentially of a continuous polystyrene matrix having dispersed therein gelled particles consisting essentially of polystyrene grafted to a polydiorganosiloxane gum with inclusions of free polystyrene having a range of diameters from 0.05 to 100 microns inclusive where the geometric mean diameter is from 0.5 to 10 microns, and which has values for room temperature notched Izod impact strengths in foot pounds per inch of notch, wherein the notch is 45 degrees and 0.1 inch deep, of at least 0.40 for compression molded and unorientated samples, said polydiorganosiloxane gum having a Williams plasticity greater than 0.020 inch and consisting essentially of from 50 to 99.9 mol percent dimethylsiloxane units, from 0 to 50 mol percent methylphenylsiloxane units, from 0 to 25 mol percent diphenylsiloxane units and from 0.1 to 30 mol percent methylvinylsiloxane units, said polydiorganosiloxane gum being endblocked with silicon-bonded hydroxyl radicals or triorganosiloxy units wherein the organic radicals are selected from methyl, phenyl and vinyl.

In the present mass polymerization method, a mixture of styrene and polydiorganosiloxane gum is heated to a temperature from 80° to 150°C. preferably 100°C to 130°C. while the mixture is agitated. This mixture is heated and agitated until from 10 to 40 weight percent of the styrene monomer has polymerized to polystyrene, preferably from 20 to 35 weight percent of the styrene monomer is polymerized. The agitation rate must be sufficient enough to provide particles which consist essentially of the polydiorganosiloxane gum in the partially polymerized styrene mixture where the particles have an average particle size of from 0.5 to 10 microns. When the particles have an average size outside this range, the final product is not a toughened polystyrene. The means of agitation is not particularly critical as long as the rate is sufficient to provide the specified particle size. The rate of agitation will vary with each piece of equipment and will depend upon size, geometry, type of stirrer and the like. The proper rate of agitation can readily be determined for each piece of equipment by taking a sample of the mixture after the styrene has started to polymerize and obtaining a photomicrograph of the sample. It can be suggested that for most conventional polymerizing apparatus used to polymerize styrene and equipped with an agitation mechanism that the rate of agitation be high.

After from 10 to 40 weight of the styrene monomer has polymerized to polystyrene, the partially polymerized styrene mixture is heated at higher temperatures than during the first step but the rate of agitation is reduced. The rate of agitation is not critical in this step and in fact, the agitation can be completely discontinued. The agitation may be, for example, only that amount necessary to move the mixture through a heating unit in a continuous polymerization process. For example, in a batch process, the partially polymerized styrene mixture can be poured into containers or envelopes and heated without agitation. The heating temperature is increased above that temperature which was used in the first step, preferably this is a gradual increase. In a continuous process, a graduated heating unit can be used wherein the mixture passes slowly to higher temperature sections of the unit. Preferably, the temperature is increased to a maximum temperature in the range of from 160° to 180°C. The mixture is heated until substantially all the styrene monomer has polymerized. By the phrase "substantially all the styrene monomer has polymerized", it is to be understood that for any specific set of conditions, including equipment, that for all practical purposes all the styrene monomer has polymerized to polystyrene but there remains some small amount of unpolymerized styrene monomer.

After the styrene monomer is substantially polymerized to polystyrene, the mixture is heated above 200°C. for at least 10 minutes. The time and temperatures used in this heating step should not be sufficient to degrade the polystyrene, but should be sufficient enough to substantially remove any volatile ingredients from the polymerized mass. For efficiency, this heating step to remove volatiles can be carried out under a vacuum.

The above described method can use equipment which is known to the art of mass polymerization of styrene by either the batch methods or continuous methods of polymerization as long as the specific requirements of the present method are met. For best results, this process should be performed under an inert atmosphere free of oxygen, particularly the first two steps.

The resulting product of this method is a toughened polystyrene which contains gelled particles dispersed therein. These gelled particles have a range of diameters from 0.05 to 100 microns inclusive where the geometric mean diameter is from 0.5 to 10 microns. Compression molded and unorientated samples of the toughened polystyrene have values for room temperature notched Izod impact strengths in foot pounds per inch of notch wherein the notch is 45 degrees and 0.1 inch deep of at least 0.40.

The mixture which is polymerized in this method can be from 70 to 99.75 weight percent styrene monomer and from 0.25 to 30 weight percent polydiorganosiloxane gum. Preferably, the mixture is from 90 to 99 weight percent styrene monomer and from 1 to 10 weight percent polydiorganosiloxane gum. The polydiorganosiloxane gums suitable for use in this method are those which are benzene soluble, have a Williams plasticity of at least 0.020 inch and are composed of from 50 to 99.9 mol percent dimethylsiloxane units, 0 to 50 mol percent methylphenylsiloxane units, from 0 to 25 mol percent diphenylsiloxane units and from 0.1 to 30 mol percent methylvinylsiloxane units. Preferably, the polydiorganosiloxane gums contain dimethylsiloxane units and methylvinylsiloxane units and the preferred amounts of the methylvinylsiloxane units are from 1 to 11 mol percent. These polydiorganosiloxane gums are endblocked with siliconbonded hydroxyl radicals and/or triorganosiloxy units where the organic groups are selected from methyl, phenyl and vinyl. These polydiorganosiloxane gums can also include small amounts of other organic radicals bonded to the silicon atoms as long as these organic radicals are not detrimental to the polymerization process and to the properties of the final product. Some small amounts of these other organic radicals may even be helpful, such as the mercaptoalkyl radicals. By small amounts, it is considered to be less than about one or two mol percent. Additionally, small amounts of other siloxane units, such as monoorganosiloxane units and $SiO_2$ units can be present as long as the polydiorganosiloxane is benzene soluble.

This method does not preclude the use of other toughening additives such as polybutadiene. However, such additives are not required to obtain a toughened polystyrene. Other additives conventionally used in the bulk polymerization of styrene can also be used in the present compositions.

The toughened polystyrenes of this invention have a continuous matrix of polystyrene with gelled particles dispersed therein. These gelled particles consist essentially of polystyrene grafted to the polydiorganosiloxane gum with inclusions of free polystyrene.

The method of the present invention provides a toughened polystyrene without the use of free radical catalysts, such as organic peroxides, can be used in equipment which is presently used by manufacturers who polymerize styrene by mass polymerization methods, and does not radically alter the techniques which are familiar to those skilled in the art of mass polymerization of styrene.

The toughened polystyrene of this invention is useful in many applications where polystyrene was previously considered unsuitable. The toughened polystyrene of this invention has a combination of lubricity and impact strength which is not obtainable from polystyrene toughened in other ways such as with polybutadiene. These properties make the present material suitable, for example, for making tape cassettes, gears and phonograph records. The compositions also have improved low temperature impact strength compared to other high impact polystyrenes, as well as, advantages in ductility, heat distortion temperature and tensile strength. The compositions of this invention can be used to make articles by the cold forming process. The toughened polystyrene is thermoplastic and can be fabricated and used in the manner of other polystyrene. Additionally, the release properties from molds are improved and the handling properties are better than polystyrene and other commercially available toughened polystyrene. The improved weatherability makes the toughened polystyrene of this invention useful in some outdoor applications. These and other properties will be apparent from the examples.

The following examples are presented for illustrative purposes only and should not be construed as limiting the present invention which is properly delineated in the claims. The particle sizes were determined by the use of photomicrographs for compositions below containing the polydiorganosiloxane gum and were within the range set forth above.

EXAMPLE 1

To a 5 liter flask containing 919 grams of uninhibited styrene, 36.7 grams of a polydiorganosiloxane gum having 21 mol percent methylvinylsiloxane units and 79 mole percent dimethylsiloxane units and having a Williams plasticity of 0.079 inch as determined by ASTM-D-926-67 procedure was added to the styrene and stirred for two hours at room temperature to dissolve the gum. This mixture was heated to 130°C. while stirring at a rate of 144 r.p.m. and purging with nitrogen. A period of 30 minutes was required to reach 130°C, and the 130°C. temperature was maintained for 1.75 hours. This mixture became white and thick like syrup. The contents of the flask was poured into aluminum envelopes which were suspended in a silicone fluid bath which was at 125°C. to 130°C. The envelopes where 7 inches by 7 inches by one-fourth inch. The envelopes were closed except for a small vent hold in the top above the bath surface. The bath was heated so that the temperature increased at a rate of about 7.5°C. per hour. When the temperature of 175°C. was reached, the envelopes were removed from the bath and allowed to cool. The top edge of each slab of polystyrene composition was yellowish in color and was removed. The slabs were then chipped, and heated in a vacuum oven for various times and temperatures as described in Table I. The vacuum oven was purged with nitrogen and during the heating process for the polystyrene composition, a slow bleeding of nitrogen was permitted to keep the atmosphere substantially free from air. The oven was cooled to 150° to 155°C. before removing the polystyrene composition. The polystyrene compositions were also heated at 160°C. in a vacuum oven for an additional two hours except for Sample F. After the volatile materials were removed the polystyrene composition contained about four weight percent polydiorganosiloxane gum. The amount of volatiles and the notched Izod Impact strengths were as shown in Table I. The notched Izod impact strengths were determined according to the procedure of ASTM-D256-56T using the following test conditions: a 45 degree notch 0.1 inch deep and room temperature. The test samples for impact strength were prepared by placing the toughened polystyrene composition in a CAM head of a Brabender Plasticorder and mixing for 6 minutes at 63 r.p.m. at 195°C. The hot mass was then placed in a chase and compression molded at 175°C. for 3 minutes at 4000 p.s.i. The notched Izod impact strength was recorded in foot pounds per inch of notch.

TABLE I

| Sample | Heating Conditions Minutes | at | °C. | Weight % Volatiles Removed | Impact Strength |
|---|---|---|---|---|---|
| A | 40 | | 295 | 4.0 | 0.66 |
| B | 20 | | 295 | 2.6 | 0.72 |
| C | 40 | | 285 | 3.6 | 0.65 |
| D | 30 | | 285 | 4.0 | 0.65 |
| E | 20 | | 285 | 3.8 | 0.72 |
| F | 20 | | 280 | 3.6 | 0.95 |

EXAMPLE 2

Polystyrene compositions were prepared by the procedure described in Example 1 with the following exceptions. The amount of polydiorganosiloxane gum was varied as described in Table II, a 0.2 weight percent of a heat stability additive was used, the silicone fluid bath for heating the envelopes was at 135°C. and was heated to 170°C. at a rate of about 7°C. per hour, and the 2 hours of oven heating at 160°C. was eliminated. The polystyrene compositions were given a heat treatment of 20 minutes at 250°C. The impact strengths were determined as shown in Example 1.

TABLE II

| Sample | Weight % gum in Polystyrene Composition | Weight % Volatiles Removed | Impact Strength |
|---|---|---|---|
| A* | 0 | — | 0.33 |
| B | 2 | 7.5 | 0.52 |
| C | 4 | 6.6 | 0.86 |
| D | 8 | 6.7 | 1.42 |

TABLE II-continued

| Sample | Weight % gum in Polystyrene Composition | Weight % Volatiles Removed | Impact Strength |
|---|---|---|---|
| E | 16 | 5.0 | 1.86 |
| F | 26 | 8.9 | 1.08 |

*A commercial polystyrene

EXAMPLE 3

The following toughened polystyrene compositions were prepared as described in Example 2 with 4 weight percent polydiorganosiloxane gums having varying amounts of methylvinylsiloxane units as shown in Table III. The impact strengths were determined as described in Example 1.

TABLE III

| | Polydiorganosiloxane Gum | | Impact Strength | |
|---|---|---|---|---|
| Sample | Mol % $CH_3(CH_2=CH)SiO$ | Williams Plasticity, inches | Heating 20 min. at 250°C. | Heating 20 min. at 220°C. |
| A | 21 | 0.078 | 1.01 | 0.89 |
| B | 10 | 0.070 | 0.65 | 0.55 |
| C | 9.5 | 0.049 | 0.70 | — |
| D | 4 | — | 0.57 | 0.46 |
| E | 2 | 0.074 | 0.43 | — |
| F | 0.97 | — | 0.43 | — |
| G | 0.142 | 0.068 | 0.44 | 0.43 |
| H | 0.000 | 0.063 | 0.37 | — |

EXAMPLE 4

A toughened polystyrene composition was prepared as described in Example 2, C. except the polydiorganosiloxane gum had 13.3 mol percent methylvinylsiloxane units, 11.0 mol percent methylphenylsiloxane units and 75.7 mol percent dimethylsiloxane units. The sample was heated for 20 minutes at 250°C. and a compression molded sample had a notched Izod impact strength of 0.76 foot pounds per inch of notch.

EXAMPLE 5

Toughened polystyrene compositions were prepared as described in Example 2 except as follows:
  A. The polystyrene composition of Example 3, A. where the heating step was 20 minutes at 250°C., Impact strength of 1.01.
  B. The polystyrene composition of Example 3, B. where the heating step was 20 minutes at 250°C., Impact strength of 0.65.
  C. A polystyrene composition prepared with 4 weight percent of a polydiorganosiloxane gum having 4 mol percent of methylvinyl-siloxane units and 96 mol percent dimethylsiloxane units and heated for 20 minutes at 220°C., Impact strength of 0.63.
  D. A high impact commercial polystyrene which was modified with polybutadiene, Impact strength of 0.98.

The coefficient of friction and wear rate for each of the above compositions were determined by using the LFW-6 Thrust Washer Testing Machine. The compositions were molded into a disc with a washer on one side having a standard diameter and thickness. A steel washer was mated with the molded washer rotating at 15 feet per minute beginning at room temperature. The load on the steel washer which mated with the test washer was varied as the test proceeded as shown in Tables IV to VII as pressure in pounds per square inch (p.s.i.). The test was continued until the molded washer was worn completely away. The temperatures shown resulted from friction, no heating was used. The rate at which the washer wears was observed and was as shown in Table VIII as the wear rate in inches per hour. The wear rates shown are averages for the time periods shown in Tables IV to VII.

TABLE IV

Composition A

| Time, Hours | Pressure, p.s.i. | Maximum Temperature, °C. | Average Coefficient of Friction |
|---|---|---|---|
| 0.19 | 46.5 | 23 | 0.22 |
| 0.39 | 93.0 | 25 | 0.22 |
| 0.61 | 139.5 | 27 | 0.21 |
| 0.86 | 186.0 | 31 | 0.21 |
| 1.06 | 232.5 | 32 | 0.21 |
| 1.27 | 279.0 | 37 | 0.23 |
| 1.46 | 325.5 | 39 | 0.20 |
| 1.60 | 372.0 | 41 | 0.22 |
| 1.84 | 418.5 | 42 | 0.19 |
| 2.01 | 465.0 | 43 | 0.21 |
| 2.23 | 558.0 | 45 | 0.20 |
| 2.42 | 651.0 | 49 | 0.18 |
| 2.63 | 744.0 | 53 | 0.18 |
| 2.91 | 837.0 | 55 | 0.17 |
| 3.21 | 930.0 | 57 | 0.17 |
| 3.37 | 1023.0 | 57 | 0.17 |

TABLE V

Composition B

| Time, Hours | Pressure, p.s.i. | Maximum Temperature, °C. | Average Coefficient of Friction |
|---|---|---|---|
| 0.20 | 46.5 | 28 | 0.19 |
| 0.39 | 93.0 | 31 | 0.23 |
| 0.60 | 139.5 | 33 | 0.23 |
| 0.73 | 93.0 | 27 | 0.25 |
| 0.92 | 139.5 | 30 | 0.25 |
| 1.13 | 186.0 | 33 | 0.21 |
| 1.40 | 232.5 | 36 | 0.20 |
| 1.60 | 279.0 | 38 | 0.18 |
| 1.80 | 325.5 | 41 | 0.21 |
| 2.06 | 372.0 | 44 | 0.18 |
| 2.26 | 418.5 | 47 | 0.18 |
| 2.54 | 465.0 | 49 | 0.21 |
| 2.76 | 558.0 | 50 | 0.18 |
| 3.05 | 651.0 | 53 | 0.19 |
| 3.43 | 744.0 | 55 | 0.18 |
| 3.66 | 837.0 | 57 | 0.17 |
| 3.90 | 930.0 | 59 | 0.16 |
| 4.52 | 1023.0 | 60 | 0.16 |

TABLE VI

Composition C

| Time, Hours | Pressure, p.s.i. | Maximum Temperature, °C. | Average Coefficient of Friction |
|---|---|---|---|
| 0.21 | 46.5 | 25 | 0.16 |
| 0.42 | 93.0 | 29 | 0.25 |
| 0.61 | 139.5 | 31 | 0.25 |
| 0.95 | 186.0 | 33 | 0.24 |
| 1.14 | 232.5 | 35 | 0.22 |
| 1.23 | 93.0 | 27 | 0.32 |
| 1.36 | 186.0 | 31 | 0.25 |
| 1.56 | 232.5 | 34 | 0.22 |
| 1.86 | 279.0 | 37 | 0.22 |
| 2.06 | 325.5 | 39 | 0.21 |
| 2.26 | 372.0 | 41 | 0.20 |
| 2.46 | 465.0 | 42 | 0.18 |
| 2.66 | 558.0 | 43 | 0.18 |
| 2.86 | 651.0 | 45 | 0.16 |
| 3.04 | 744.0 | 47 | 0.15 |
| 3.20 | 837.0 | 48 | 0.13 |
| 3.46 | 930.0 | 49 | 0.13 |

TABLE VI-continued

Composition C

| Time, Hours | Pressure, p.s.i. | Maximum Temperature, °C. | Average Coefficient of Friction |
|---|---|---|---|
| 3.70 | 1023.0 | 49 | 0.13 |

TABLE VII

Composition D

| Time, Hours | Pressure, p.s.i. | Maximum Temperature, °C. | Average Coefficient of Friction |
|---|---|---|---|
| 0.19 | 46.5 | 27 | 0.54 |
| 0.40 | 93.0 | 33 | 0.54 |
| 0.66 | 139.5 | 37 | 0.48 |

TABLE VIII

| Composition | Wear Rate, inches/hour |
|---|---|
| A | 0.011 |
| B | 0.0069 |
| C | 0.0056 |
| D | 0.073 |

EXAMPLE 6

Test samples of the toughened polystyrene composition of Example 5, A. were prepared by mixing the material in a Brabender Plasticorder at 195°C. for six minutes at 62 r.p.m. The material was then placed in a chase and compression molded at 320°F. Test samples of a commercially available high impact polystyrene as defined in Example 5, D. was also compression molded at 320°F. These test samples were placed in a carbon arc weatherometer for defined periods of time and the notched Izod impact strengths were determined and were as shown in Table IX.

TABLE IX

| Weatherometer Exposure Time, hours | Toughened Polystyrene Composition | | Commercial High Impact Polystyrene | |
|---|---|---|---|---|
| | Impact Strength | % Change | Impact Strength | % Change |
| 0 | 1.01 | — | 0.98 | — |
| 250 | 0.76 | −24.8 | 0.61 | −37.8 |
| 500 | 0.64 | −36.6 | 0.40 | −59.2 |

That which is claimed is:

1. A method for the mass polymerization of styrene comprising
    A. heating at a temperature from 80° to 150°C. a mixture of 70 to 99.75 weight percent styrene and 0.25 to 30 weight percent of a benzene soluble polydiorganosiloxane gum, said mixture being heated and agitated until from 10 to 40 weight percent of the styrene has polymerized producing a partially polymerized styrene mixture having particles dispersed therein containing the polydiorganosiloxane gum, said agitation being at a sufficient rate to provide an average particle size of from 0.5 to 10 microns,
    B. continuing to heat the partially polymerized styrene mixture at a temperature higher than in step (A) until the styrene is substantially polymerized to polystyrene, during step (B) the agitation rate being reduced below the rate of step (A), thereafter
    C. heating the product obtained from step (B) above 200°C. for at least 10 minutes and until the polymerized mass is substantially free of volatile ingredients but at temperatures and times insufficient to degrade the polystyrene, and thereafter a toughened polystyrene is obtained which consists essentially of a continuous polystyrene matrix having dispersed therein gelled particles consisting essentially of polystyrene grafted to a polydiorganosiloxane gum with inclusions of free polystyrene, having a range of diameters from 0.05 to 100 microns inclusive where the geometric mean diameter is from 0.5 to 10 microns, and which has values for room temperature notched Izod impact strengths in foot pounds per inch of notch wherein the notch is 45 degrees and 0.1 inch deep, of at least 0.40 for compression molded and unorientated samples,
    said polydiorganosiloxane gum having a Williams plasticity greater than 0.020 inch and consisting essentially of from 50 to 99.9 mol percent dimethylsiloxane units, from 0 to 50 mol percent methylphenylsiloxane units, from 0 to 25 mol percent diphenylsiloxane units and from 0.1 to 30 mol percent methylvinylsiloxane units, said polydiorganosiloxane gum being endblocked with silicon-bonded hydroxyl radicals or triorganosiloxy units wherein the organic radicals are selected from methyl, phenyl and vinyl.

2. The method in accordance with claim 1 in which the agitation is discontinued after step (A).

3. The method in accordance with claim 1 in which the mixture in step (A) is heated to a temperature from 100° to 130°C. until from 20 to 35 percent of the styrene has polymerized, thereafter gradually increasing the temperature in step (B) to a temperature from 160° to 180°C., and thereafter heat under vacuum.

* * * * *